Oct. 13, 1970     L. O. McAFEE     3,533,170
MECHANISM FOR PORTRAYING AN AUTOMOBILE WHEEL MOUNT DISPLACEMENT
Filed April 25, 1967     7 Sheets-Sheet 1
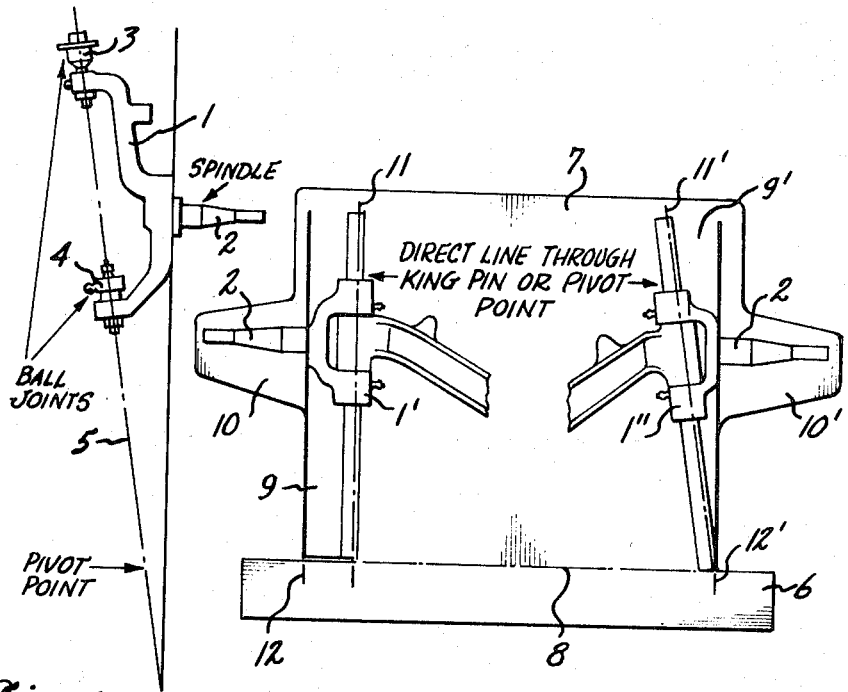
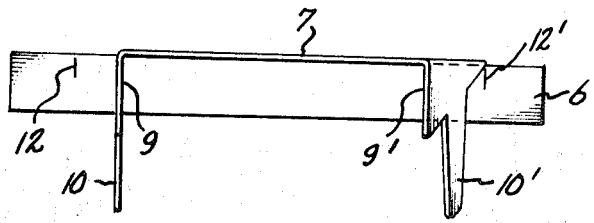
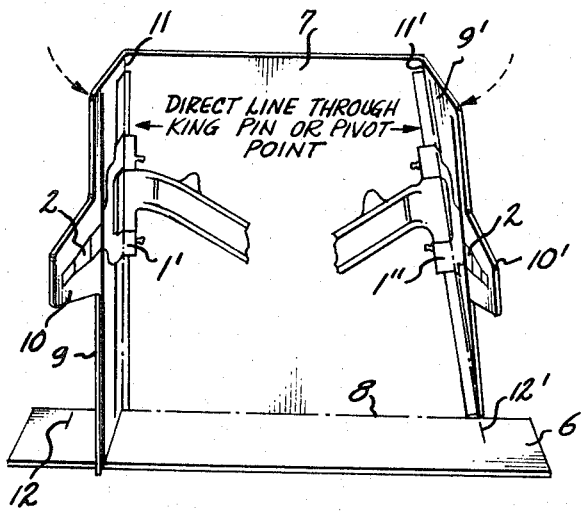
INVENTOR.
LOYD O. McAFEE
BY
Robert W. Beach
ATTORNEY Oct. 13, 1970          L. O. McAFEE          3,533,170
MECHANISM FOR PORTRAYING AN AUTOMOBILE WHEEL MOUNT DISPLACEMENT
Filed April 25, 1967          7 Sheets-Sheet 3
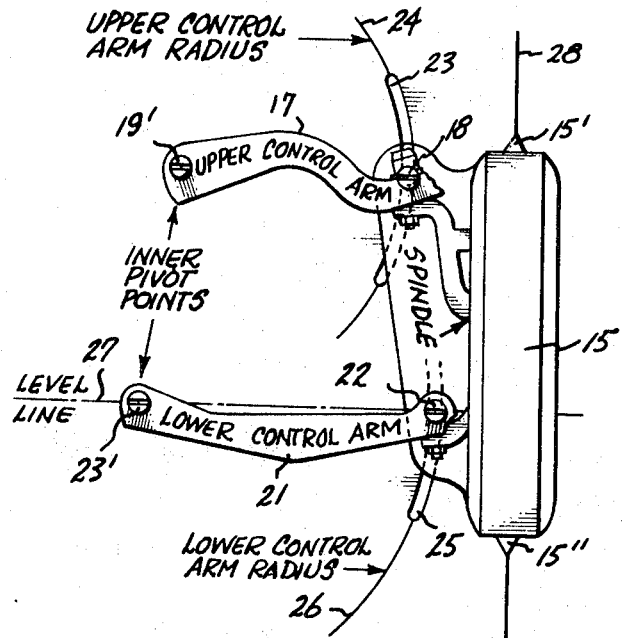
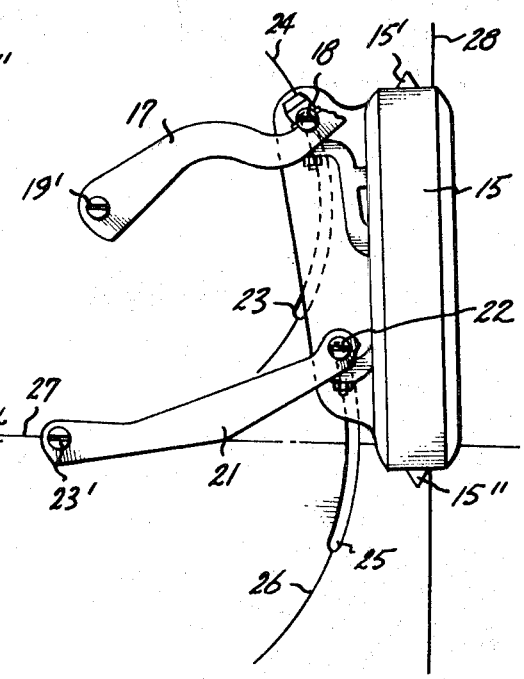
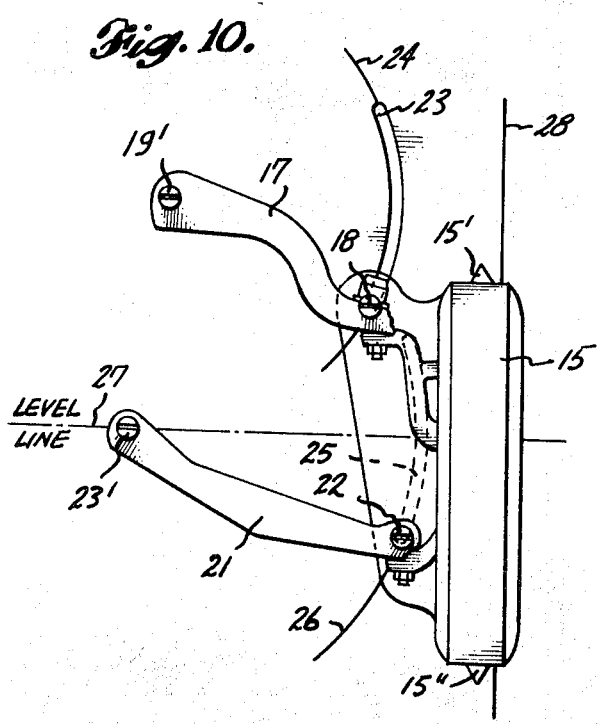
INVENTOR.
LOYD O. McAFEE
BY
*Robert W. Beach*
ATTORNEY Oct. 13, 1970     L. O. McAFEE     3,533,170
MECHANISM FOR PORTRAYING AN AUTOMOBILE WHEEL MOUNT DISPLACEMENT
Filed April 25, 1967     7 Sheets-Sheet 4

INVENTOR.
LOYD O. McAFEE
BY
*Robert W. Beach*
ATTORNEY

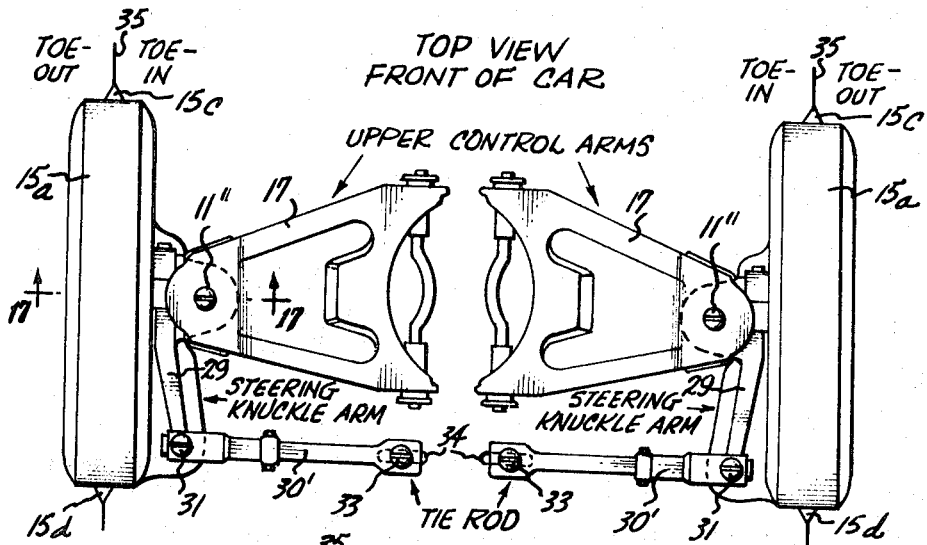
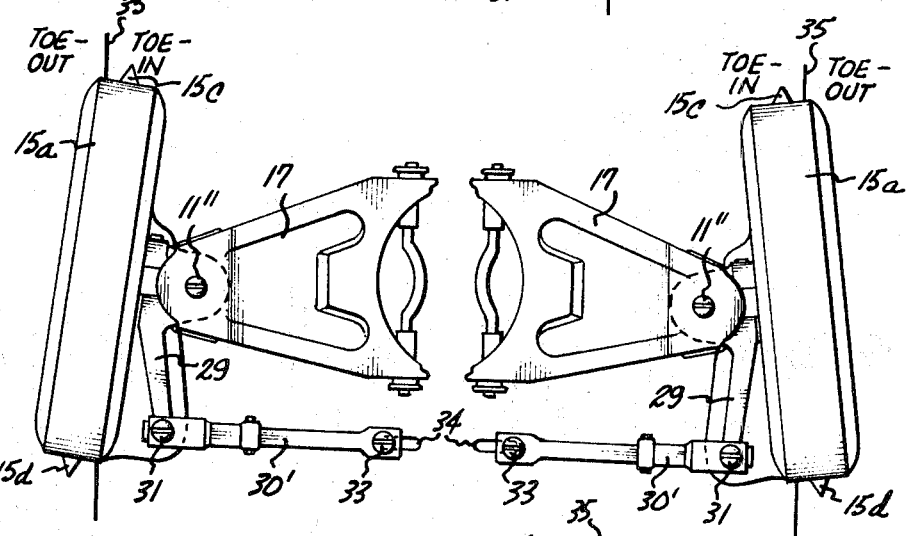
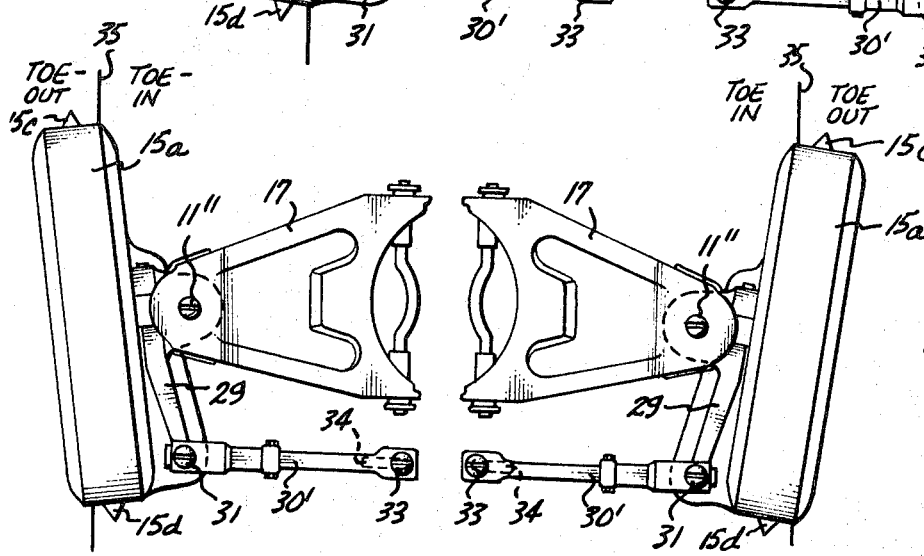
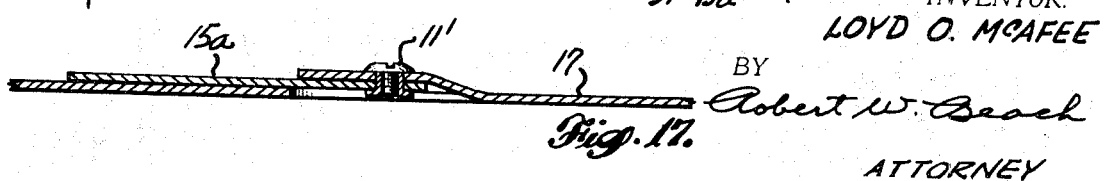

Oct. 13, 1970 L. O. McAFEE 3,533,170
MECHANISM FOR PORTRAYING AN AUTOMOBILE WHEEL MOUNT DISPLACEMENT
Filed April 25, 1967 7 Sheets-Sheet 6

INVENTOR.
LOYD O McAFEE
BY
Robert W. Beach
ATTORNEY

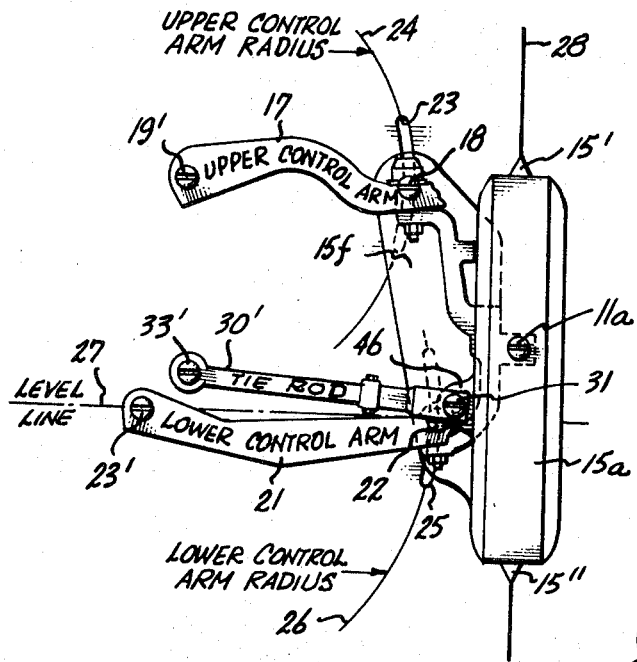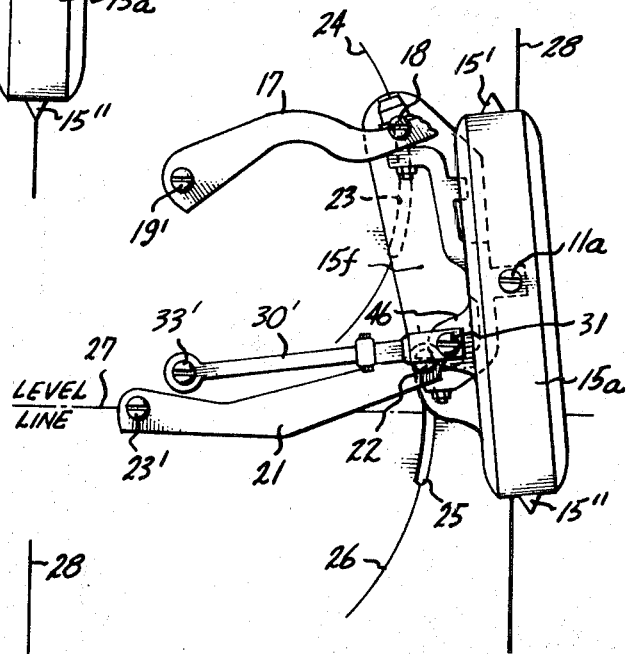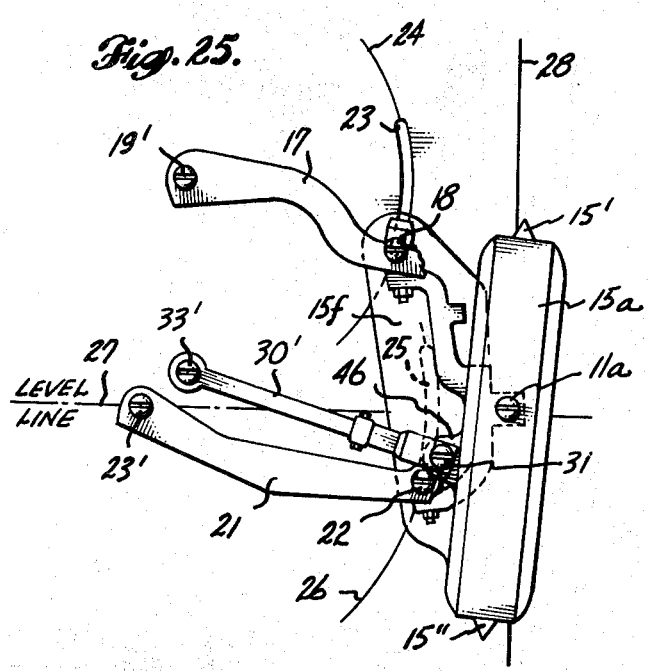

United States Patent Office 3,533,170
Patented Oct. 13, 1970

3,533,170
MECHANISM FOR PORTRAYING AN AUTOMOBILE WHEEL MOUNT DISPLACEMENT
Loyd O. McAfee, Seattle, Wash., assignor to McGraw-Hill, Inc., New York, N.Y., a corporation of New York
Filed Apr. 25, 1967, Ser. No. 633,574
Int. Cl. G09b 25/02
U.S. Cl. 35—13                                                    20 Claims

ABSTRACT OF THE DISCLOSURE

For instruction purposes components of wheel mounting and control assemblies including a wheel, a spindle, a spindle mounting yoke, control arms, tie rod and steering arms are simulated by strips and sheets pivotally mounted or connected to typify portions of automobile front wheel mechanism for inclusion in a manual. Such components can be moved relatively to portray the effect of king pin or yoke pivot inclination, changes in camber, the action of control arm swing, tie rod action, the effect of caster and the meaning of toe-in and toe-out.

---

The principal object of the invention is to provide an aid for teaching the effect on automobile front wheel displacement of moving or adjusting various wheel supporting or controlling components by enabling a student to manipulate a simulated wheel support.

It is a further object for such wheel support and its associated components to be made of comparatively small, light and inexpensive material which have the appearance of corresponding actual components but which can be manipulated readily in controlled fashion.

More specifically, it is an object to provide such a teaching aid which can be manipulated by the student at will in the manner and at the speed which he may prefer to facilitate his understanding of the relative movement and operation of the various components and which will provide a quicker and better understanding than would similar manipulation of corresponding components of an actual wheel mounting and control assembly.

Another object is to provide different representative assemblies of simulated wheel mounting and control components for the purpose of portraying or demonstrating different respective features or characteristics of an automobile wheel mounting and control assembly.

FIG. 1 is a diagrammatic representation of an automobile wheel-supporting spindle and yoke. FIG. 2 is a plan of simulated wheel-mounting components to portray the effect of king pin or yoke pivot inclination, FIG. 3 is a similar view with parts in a different relationship and FIG. 4 is a top perspective of the same structure showing the parts substantially in the same relationship as shown in FIG. 3.

FIGS. 5, 6 and 7 are plans of a simulated wheel mount and control arm assembly with components shown in different relationships in FIGS. 5, 6 and 7, respectively.

FIGS. 8, 9 and 10 are plans of an assembly of simulated wheel mount and control arm components mounted in a manner different from the mounting of such components in FIGS. 5, 6 and 7 with the components shown in different relationships in FIGS. 8, 9 and 10, respectively.

FIGS. 11, 12 and 13 are plans of simulated automobile wheel mounts, steering arm and tie rod components with the components being shown in different relationships in FIGS. 11, 12 and 13, respectively.

FIGS. 14, 15 and 16 are plans of simulated automobile wheel mounts, steering arm and tie rod components mounted differently from the components of FIGS. 11, 12 and 13 and showing such components in different relationships in FIGS. 14, 15 and 16, respectively. FIG. 17 is a detail cross section taken on lines 17—17 of FIG. 14.

FIGS. 23, 24 and 25 are plans of simulated automobile wheel mount, control arm and tie rod assemblies with the components being shown in different relationships in FIGS. 23, 24 and 25, respectively.

Figure 5:
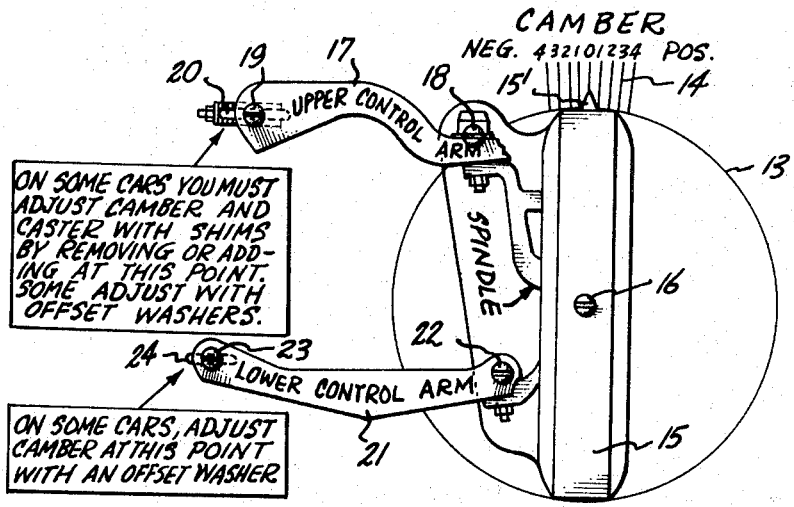

In order to function properly, the front wheels of automobiles must be mounted correctly and their displacement relative to the automobile chassis controlled effectively. For this purpose adjustments in the wheel mounting and control mechanism must be made accurately. In order for the mechanic to be able to make such adjustments properly, it is necessary for him to understand the control functions of various components of the wheel-mounting assembly and the objectives sought by the adjustments to be made. It is difficult to manipulate an actual wheel assembly to understand and demonstrate the purpose and effect of the various wheel-mounting assembly components because of their inaccessibility, the difficulty of effecting suitable demonstration movements of the various components and the undesirability of effecting such relative movements in an actual automobile installation.

Also, for teaching purposes, it is desirable to have an aid which can direct the attention of the student to one particular feature of the wheel mounting and control assembly at a time so that he will understand the nature and operation of such feature without reference to unrelated features of the assembly. The present invention enables the attention of the student to be concentrated on particular characteristics of an automobile wheel mounting and control assembly and to manipulate such components most effectively for teaching purposes. Consequently, such a teaching aid is far more effective than still pictures or motion pictures to accomplish the particular objective of understanding. At the same time, the simulated wheel mounting and control assemblies can be incorporated in a teaching manual because they are constructed of strip and sheet material which may be of cardboard or thin plastic.

The various assemblies shown in the drawings are of similar construction in that they all include a simulated wheel mount element which may additionally carry the representation of a wheel with means for mounting such wheel mount element to portray it in different positions with respect to a reference. The particular type of mounting or control arrangement for the simulated wheel mount depends on the particular type of displacement of the wheel mount which it is desired to illustrate in each instance. Because the various types of assembly are intended to illustrate wheel mount displacements of different character, it is appropriate for the various types of assembly described below to be associated in the same manual.

Each sheet of the drawing represents a different embodiment of the present invention, each of which embodiments has been devised to teach or illustrate a particular characteristic of an automobile wheel mounting and control assembly. An assembly for illustrating the significance and purpose of king pin or yoke pivot inclination is shown in FIGS. 2, 3 and 4. FIG. 1 is simply a printed diagram of an automobile front wheel mounting yoke 1 from which a spindle 2 projects on which a wheel would be rotatively mounted. The yoke 1 is carried by an upper ball joint 3 attached to its upper end and a lower ball joint 4 attached to its lower end. The axis 5 joining the ball joints 3 and 4 is inclined relative to a perpendicular through the base of spindle 2 at an angle of approximately eight degrees. This inclination angle should be such with relation to the radius of the tire of the wheel mounted on spindle 2 and the offset of the ball joints from the central plane of the wheel as to cause the axis 5 of the ball joints to intersect the bottom of the tire tread midway between the opposite sides of the tire.

The importance of such inclination of the yoke pivot axis can be demonstrated by the assembly shown in FIGS. 2, 3 and 4. This assembly can be made practically of cardboard including a cardboard strip base 6 which can be bonded to a page of an instruction manual. A loose flap 7 is connected to the upper edge of base 6 by a weekened hinge line 8. On one edge of the main flap 7 is an auxiliary flap 9 including a projection 10, which is connected to the main flap by a weakened hinge line 11. On the main flap 7, the auxiliary flap 9 and its projection 10 is printed the representation of the end portion of an automobile axle, an exaggerated king pin and a wheel mounting yoke 1' and spindle 2.

On the opposite edge of the main flap 7 is another auxiliary flap 9' having a projection 10'. This flap is attached to the main flap by a weakened hinge line 11'. On this auxiliary flap and the adjacent portion of the main flap is also printed a representation of the end portion of an axle, an exaggerated king pin, a spindle mounting yoke 1" and a wheel spindle 2. The only difference between the simulated wheel mounts shown at the opposite sides of the main flap 7 and on the associated auxiliary flaps is that in the simulated wheel mounting at the left of FIG. 2 the king pin axis and folding line 11 is perpendicular to the base folding line 8, whereas the king pin axis and folding line 11' of the simulated wheel mount at the right is inclined relative to a perpendicular to the base folding line 8 at an angle of approximately eight degrees corresponding to the angle of inclination of the yoke pivot 5 shown in FIG. 1.

The effect of the king pin axis or yoke pivot being inclined can now be demonstrated by the assembly shown in FIGS. 2, 3 and 4 by bending the main flap 7 upward about the folding line 8 from the horizontal position of FIG. 2 into the upright position of FIGS. 3 and 4. For reference purposes, an index mark 12 can be provided on the base strip 6 in line with the perpendicular through the base of the spindle 2 of the left wheel mount. Similarily, an index mark 12' can be provided on the base strip 6 in line with the perpendicular through the base of the simulated wheel mounting spindle 2 of the simulated wheel mount at the right of FIG. 2. It will be noted that the index mark 12 is spaced at substantial distance from the king pin axis hinge line 11, while the index mark 12' is intersected by the incline king pin hinge line 11' at the folding line 8 between the main flap 7 and the base strip 6.

When the main flap 7 has been raised to the upright position of FIGS. 3 and 4, the left flap 9, 10 can be swung about its king pin axis hinge line 11 to the position shown in FIGS. 3 and 4. The perpendicular through the base of the spindle will move around an arch having a radius equal to the distance between the axis 11 and index mark 12 as the flap is thus swung. Since the perpendicular through the base of the spindle 2 represents the inner face of the wheel, such swinging of the auxiliary flap 9, 10 will demonstrate to the student that by such swinging the ground-contacting area of the wheel must slide around an arch of appreciable radius. Such bodily orbital displacement of the wheel would obviously produce a scuffing action that would cause excessive tire wear.

When the right auxiliary flap 9', 10' of the simulated wheel mounting assembly is swung from the position of FIG. 2 coplanar with the main flap 7 about the king pin axis hinge line 11' into the deflected position of FIGS. 3 and 4 at an angle to the plane of the main flap, the vertical line through the base of the spindle 2 does not shift relative to the king pin axis hinge line 11'. Such movement demonstrates that the ground-engaging tread portion of a wheel mounted on spindle 2 would simply pivot on an axis passing through it instead of executing an orbital sliding movement as would a tread portion mounted on the spindle 2 of the left wheel mounting assembly shown in FIGS. 2, 3 and 4.

An instructor or a student can thus swing the left auxiliary flap 9, 10 and the right auxiliary flap 9', 10' about their respective hinge lines 11 and 11' relative to the main flap 7 separately or together, quickly or slowly, through any desired angle, as many times as may be necessary to impress graphically on the mind of the student the difference in action between a wheel mount mounted to swing about a vertical axis and a wheel mount mounted to swing about an axis inclined so that it will intersect the groundline within the area of the portion of that wheel tread engaging the ground. Such a demonstration thus impresses indelibly on the mind of the student the importance of king pin or yoke pivot axis inclination.

Figure 6:
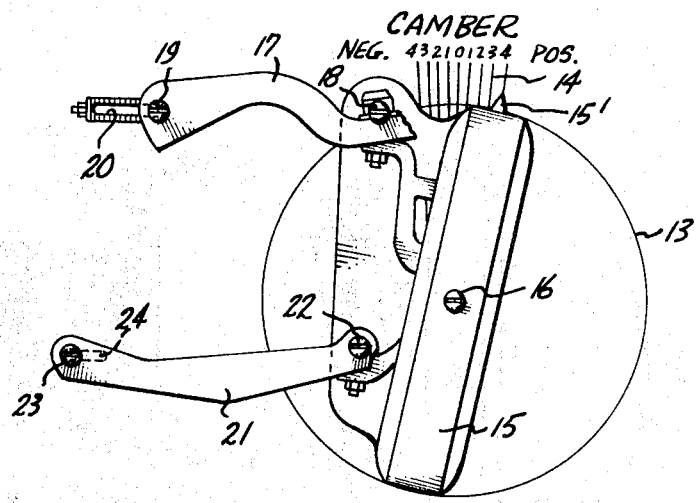
Figure 7:
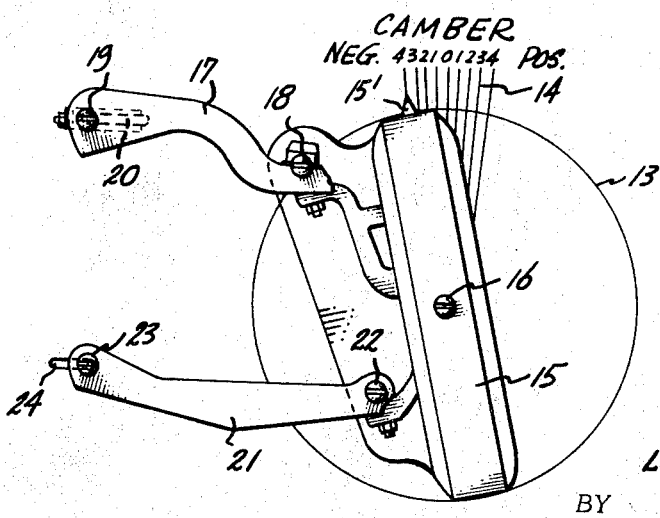

In FIGS. 5, 6 and 7 a simulated wheel mount assembly for the purpose of demonstrating the meaning and method of adjusting camber is illustrated. On the background or manual page is printed a circle 13 having a diameter equal to the diameter of a simulated automobile front wheel. At the top of this circle a camber index 14 is printed showing negative and positive camber angles from minus four degrees to plus four degrees. A sheet 15 may be of cardboard simulating a wheel mounting and wheel is printed with a representation of a spindled yoke, a wheel and the word "spindle." This simulated wheel mount is superimposed on the circle 13 and connected to the backing or manual page by a pivot pin rivet or eyelet 16. This pivot passes through the center of the wheel representation and the center of the circle 13. Turning of the wheel mount representation about pivot 16 is controlled by two control arm strips attached to such wheel mount representation. The upper simulated control arm strip 17 is secured to the simulated wheel mount sheet 15 by a pivot 18. The opposite end of such control arm is connected to the backing or manual page by a pivot 19 extending through a slot 20 in such backing or manual page. The lower simulated control arm strip 21 has one end connected by pivot 22 to the lower portion of the simulated wheel mount 15. The opposite end of such strip 21 is connected by pivot 23 to a slot 24 in the backing or manual page. Such slots extend lengthwise of the strips.

The pivots 18, 19, 22 and 23, like the pivot 16, can be a screw, a rivet or an eylet as may be preferred. Also, the strips 17 and 21 are printed with representations of control arms to give a realistic appearance to the assembly. The backing or manual page also is printed around the slot 20 with a representation of a bolt and adjusting shims. Instructions for adjusting camber, as indicated at the left of FIG. 5, can also be printed on the backing or manual page. For the purpose of demonstrating camber, only one wheel mounting and control arm assembly is provided, such as illustrated in FIG. 5. FIGS. 6 and 7 illustrate this same assembly and are simply views showing the assembly with parts in different adjusted positions.

Normally, the word "camber" is used to designate that the bottoms of the front wheels of an automobile are closer together than their tops. The extent of such positive camber can be illustrated by shifting the control arms and wheel mount so that the upper control arm 17 is moved to the right, the lower control arm 21 is moved to the left and the wheel mount is rotated in a clockwise direction from their positions shown in FIG. 5 toward their positions shown in FIG. 6. A wheel has positive camber when its upper portion is shifted outwardly and its lower position is shifted inwardly so that the plane of the wheel is tilted inwardly and downwardly relative to a vertical plane. Conversely, a wheel has negative camber when it is tilted so that its upper portion is inwardly from its lower portion and the plane of the wheel slopes downwardly and outwardly relative to vertical. The simulated wheen mount can be placed in an attitude of negative camber by shifting the upward control arm 17 to the left, the lower simulated control arm 21 to the right and rotating the simulated wheel mounting counterclockwise from their positions shown in FIG. 5 toward their positions of FIG. 7.

In the simulated wheel mounting assembly shown in FIGS. 8, 9 and 10 the same components are utilized as in the camber-portraying assembly of FIGS. 5, 6 and 7. The particular purpose of this assembly, however, is to illustrate the displacement between an automobile front wheel and the automobile chassis as the automobile travels over bumps. In this installation, therefore, the simulated wheel mount element 15 again is connected to upper control arm 17 and lower control arm 21 by pivots 18 and 22, respectively. The wheel support component is not connected directly to the backing or manual page, however, but is indirectly connected to such backing or manual page only by the control arms 17 and 21, instead of by the pivot 16. Consequently, the wheel mount member 15 can float up and down under the positioning control of the swinging control arms.

In this instance, the upper arm pivot 19′ and the lower arm pivot 23′ are not fitted in slots in the backing or manual page as in the assembly of FIG. 5, but constitute fixed inner pivot points. Swinging of the control arms about such respective pivot points can be limited by passing the pivot 18 of the control arm through an arcuate slot 23 in the backing or manual page extending along the upper control arm radius arc 24 while pivot 22 does not pass through the backing, or passing the pivot 22 of the lower control arm through an arcuate slot 25 in the backing or manual page extending along the lower control arm radius arc 26 while pivot 18 does not pass through the backing. Alternatively, both pivots 18 and 22 may pass through slots in the backing, as shown in FIG. 8, the slots 23 and 25 need only be of a length to enable arms 17 and 21 to swing enough for portraying the change in attitude of the simulated wheel mount component 15, or displacement of the wheel mount component, relative to the backing as the relative elevation of such component and backing changes.

In FIG. 9 the simulated wheel mount sheet 15 has been moved to its uppermost position permitted by travel of the control arm pivots 18 and 22 along the respective arcuate slots 23 and 25. Since the simulated upper control arm component 17 is shorter than the simulated lower control arm component 21, such upper component will have swung through a greater arc than the lower component. Consequently, as shown in FIG. 9, the upper pivot 18 has shifted to the left slightly farther than the lower pivot 22 so that the wheel will be tilted slightly from a vertical plane. The principal action of such relative elevational movement, however, is to shift the wheel bodily inward to a slight extent as indicated by the offset of the upper and lower pointers 15′ and 15″ from the vertical reference line 28 on the backing or manual page.

FIG. 10 shows the pivot 22 of the lower control arm displaced downward from the level line 27 until the pivots 18 and 22 have reached the lower ends of their slots 23 and 25. respectively. Again, it will be seen that the principal effect of the slevational change of the simulated wheel mount sheet 15 is to move the pointers 15′ and 15″ inward from the vertical reference line 28 to a slight extent. Depending upon the locations of the simulated upper control arm pivot 19′ and the simulated lower control arm pivot 23′, the wheel may tilt with reference to vertical to a greater or lesser extent. The demonstration illustrates, however, that the upper and lower control arms of an automobile front wheel operate to guide the wheel for movement essentially in a vertical attitude if the initial camber is zero, irrespective of the degree of relative elevational displacement between the wheel and the automobile chassis within the working range of the wheel springing and shock absorber mechanism.

In rounding a curve, an automobile should turn about a center along a radius through the axis of the rear wheels of the automobile in order to prevent skidding and scuffing of either rear wheel. To prevent skidding or scuffing of their front wheel, each such wheel must be swivelled so as to be perpendicular to a line from the wheel to the center of turning. Because of the distance between the two front wheels and the fact that their spacing from the rear wheels remains constant, the lines between the wheel spindles of the two wheels and the center of turning will not coincide.

The inside wheel must swivel through a greater angle than the outside wheel during every turn in order for such wheel to be perpendicular to the radius of turn through that wheel. The sharper the turn, that is, the greater the angle of swivel of the wheels, the greater will be the difference in swivel angle between the two wheels. Also, such differential swivelling of the two wheels must reverse as the automobile turns to the left or to the right so that the wheel which is the inside wheel for the particular turn will always swivel more than the wheel on the outside of the turn. The portion of the steering apparatus which effects such differential swivelling of the two front wheels about the king pin axis or yoke pivot axis is typified by the assembly of components shown in FIG. 11.

Figure 11:
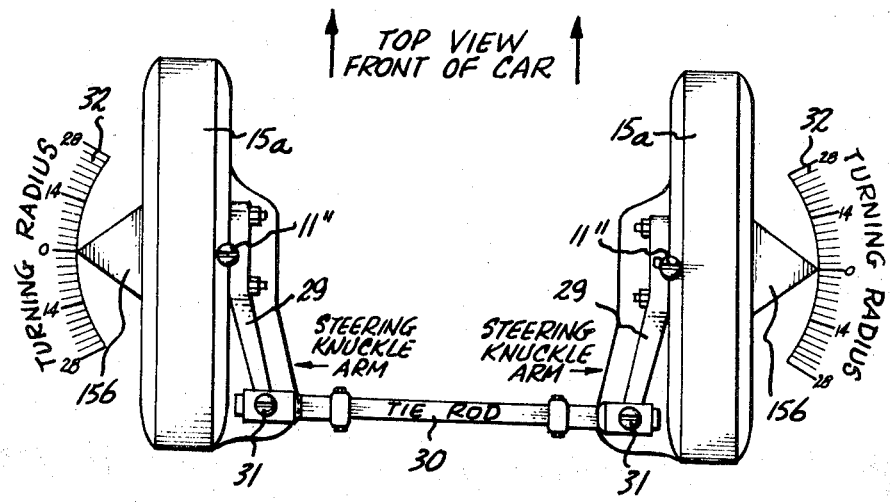

In FIG. 11 the simulated wheel mount and wheel component 15a is in the form of a sheet mounted by a pivot 11″ on the backing or manual page. The pivot 11″ corresponds to the king pin axis or yoke pivot 11′ shown in FIG. 2. The inclination of such pivot axis is not necessary to illustrate the differential swivelling action of the two front wheels. The sheets 15a are printed with representations of wheels and steering knuckle arm components 29 as well as having indicating pointers 15b projecting radially outwardly. The simulated steering knuckle arms 29 are bent so that their rearward ends are connected by a simulated tie rod strip 30. The pivots 31 connecting the opposite ends of the simulated tie rod through the respective ends of the simulated steering knuckle arms 29 are located closer together than the axis of pivots 11′.

If the steering knuckle arms were not bent, so that the distance between the simulated tie rod pivots 31 was the same as the distance between the king pin axis or steering knuckle pivots 11″, the two simulated wheel support components would swivel about their pivots 11″ through equal angles irrespective of the direction in which these components were turned and, also, irrespective of the degree of such turning. By locating the axis of pivots 31 closer together than the axis of pivots 11″ as shown in FIG. 11, however, the desired differential swivelling action of the two front wheels is obtained. Such differential swivelling action is portrayed by the movement of the components illustrated in FIGS. 12 and 13, for example.

Figure 12:
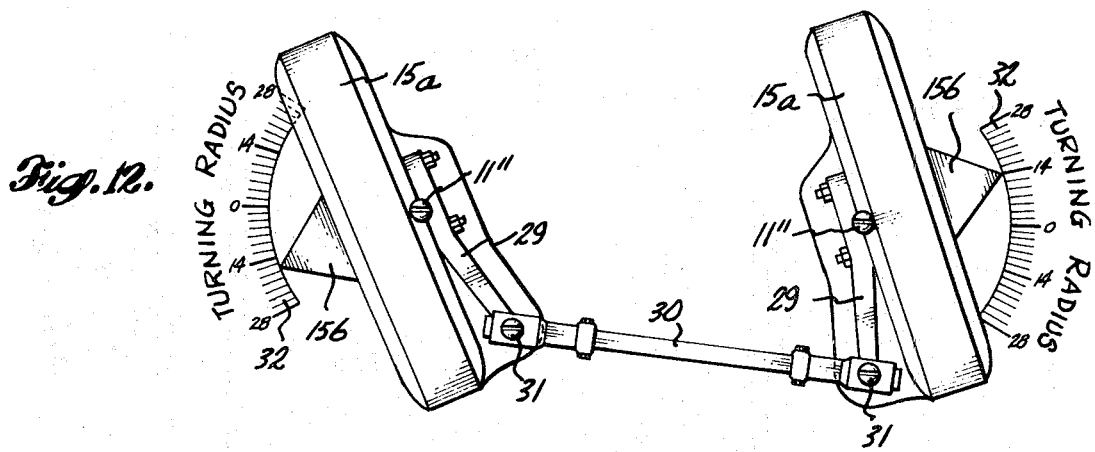
Figure 13:
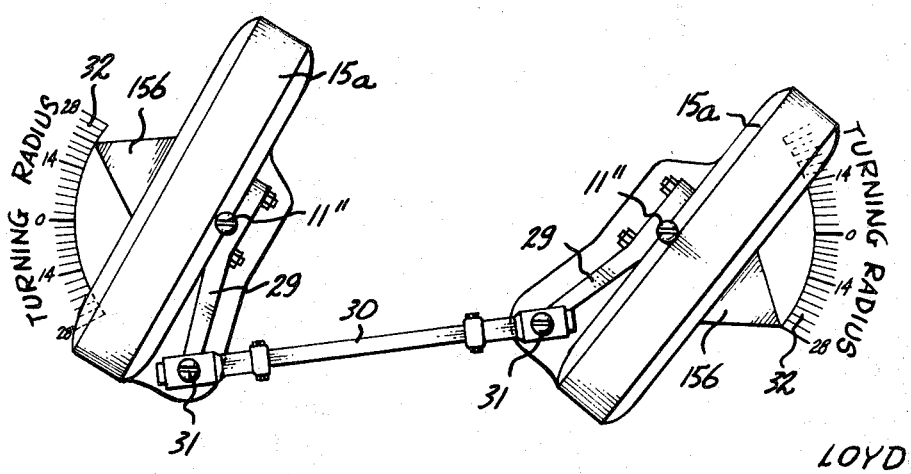

In FIG. 12 the simulated wheel mount components 15a have been swivelled counterclockwise portraying the conditions for a medium turn to the left. The left simulated wheel-support component is shown to have swivelled through an angle of seventeen degrees by noting the position of the pointer 15b on the turning radius scale 32 which is printed on the backing or manual page. The right simulated wheel support 15a on the outer side of the turn, however, has swivelled counterclockwise only through fourteen degrees as indicated by its pointer 15b on its turning radius scale 32. FIG. 13 portrays the relationship of the assembly for a sharp turn to the right.

In this instance, the right simulated front wheel mount is shown to have swivelled clockwise through an angle of twenty-eight degrees while the left simulated wheel mount component on the outer side of the turn has swivelled clockwise through an angle of only twenty-two degrees.

A comparison of the relative positions of the components in FIGS. 12 and 13 thus indicates that the more the simulated wheel-support components are swivelled in either direction, the greater will be the difference between their swivel angles. The student can swivel the simulated wheel-mount components 15a first in one direction and then the other, moving them as slowly as he may wish, to note that the difference in swivel angle increases progressively. It would be relatively tedious to make a comparison by operating correspondingly an actual automobile front wheel steering mechanism.

While the length of the tie rod 30 shown in FIGS. 11, 12 and 13 is of fixed length for the purpose of illustrating the relative swivelling action of automobile wheels during turning as described above, the tie rod length is usually adjustable for the purpose of varying the toe-in or toe-out of two front automobile wheels. The meaning of toe-in and toe-out and the procedure for varying this factor in a steering system are portrayed by the teaching assembly shown in FIGS. 14, 15 and 16. While in an actual automobile installation the tie rod 30 will be of fixed length after it is adjusted as indicated in FIG. 11, the tie rod in the assembly of FIG. 14 is shown as composed of two separate strip components 30'. The outer end of each of such tie rod sections is secured to its simulated steering knuckle arm component 29 by pivot 31 as discussed in connection with FIG. 11.

In the assembly of FIG. 14, however, the tie rod strip sections 30' are physically separate but their relative movement is limited by their adjacent ends being adjustably secured to the backing or to the manual page by pivots 33 received in slots 34, respectively. Such pivot end slot mounting of the adjacent tie rod section ends typifies a quick and excessive length adjustment of the tie rod. The simulated wheel mount components 15a are mounted for swivelling about pivots 11" which correspond to the king pin axis or yoke pivots 11' of FIG. 2. In this instance, however, the backing or manual page has been printed with representations 17 of upper control arms such as shown in FIGS. 5 and 8.

If the simulated tie rod strip sections 30' are slid outward away from each other representing a lengthening adjustment of the tie rod on an automobile, the simulated wheel-mount components 15a will be swivelled in opposite directions about their pivots 11" so that the forward pointers 15c will move toward each other from the parallel fore-and-aft reference lines 35. Correspondingly, the rearward pointers 15d on the simulated wheel-mount components 15a will move away from each other as shown in FIG. 15. The legends "toe-in" printed on the backing or manual sheet adjacent to the forward sides of the simulated wheel mount components will thus inform the student that lengthening of the tie rod in an automobile increases the amount of toe-in.

Conversely, when the simulated tie rod section strips 30' are moved toward each other from their positions of FIG. 14 to their positions of FIG. 16, the simulated wheel-mount components will be swivelled in the other opposite directions so that the forward pointers 15c are moved farther apart and the rear points 15d are moved closer together. The legend "toe-out" on the backing or manual page indicates that the simulated wheel-mount components 15a have been placed in a toe-out condition by excessive shortening of the simulated tie rod. Friction of the tires with the road will tend to spread the front portions of the wheels apart so that when the automobile is traveling at average speed the wheels will be in substantialy parallel planes when the automobile is travelling along a straight course. The amount of toe-in can be from 3/32 of an inch to 1/8 of an inch as measured between the fore and aft spacings of the wheel peripheries.

Figure 18:
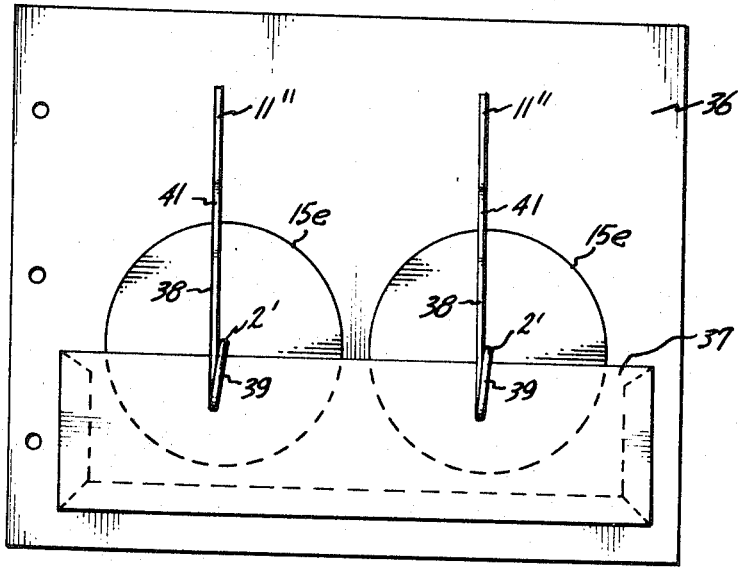
FIG. 18 is a plan of a storage arrangement in a manual for simulated automobile wheel components and mounts and FIG. 19 is an edge elevation of such a wheel component and mount.
Figure 19:
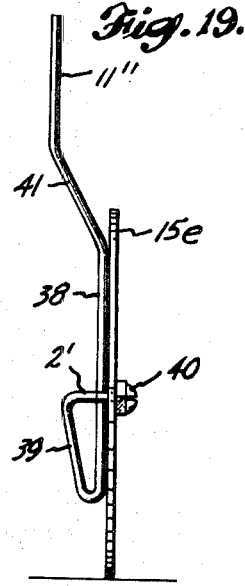

It is desirable to reduce steering effort by providing caster at least in the outside front wheel of an automobile. The purpose and effect of caster can be demonstrated by using the combination of simulated components shown in FIGS. 18 to 22 to portray the action of automobile steering wheels under different conditions of caster. In this instance, a manual page 36 may be provided with a pocket 37 in which to store two caster-demonstrating assemblies. In this instance, instead of representations of wheel components simply being printed on a sheet, the simulated wheel component 15e actually is formed as a circular sheet mounted on a wire spindle axle 2', which can be rolled along a surface. The wheel mount 38 in the form of a heavy wire or light rod has in it a loop 39 providing a backing for contact with the simulated wheel component 15e as shown in FIG. 19 and terminating in the spindle end 2'. The wheel disk is secured on the spindle component by a friction nut 40. The backing element extends to opposite sides of the axle 2' and acts to maintain the wheel disk perpendicular to the axle.

A portion 11" of the simulated wheel mount projects above the simulated wheel component 15e and corresponds to the king pin axis or yoke pivot 11' of FIG. 2. This component 11" is connected to a simulated wheel mount rod 38 by an inclined rod portion 41 so that the simulated pivot axis or knuckle joint component 11" is offset laterally inward from the plane of the simulated wheel component 15e a substantial distance. The simulated knuckle joint stems 11" are of a length sufficient to enable the student to grasp these stems, one in each hand, in the manner shown in FIG. 20.

Figure 20:
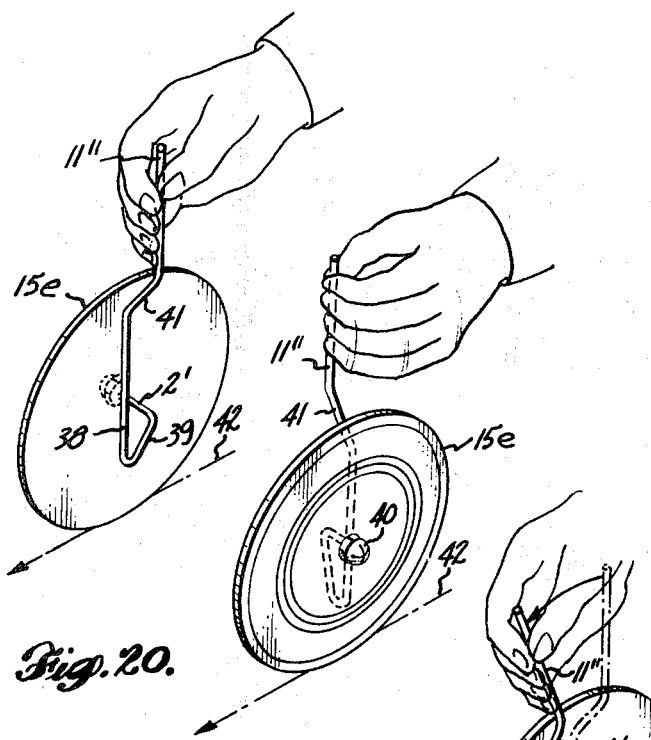
FIGS. 20, 21 and 22 are top perspectives of such simulated wheel components and mounts illustrated, respectively, in different relationships.
Figure 21:
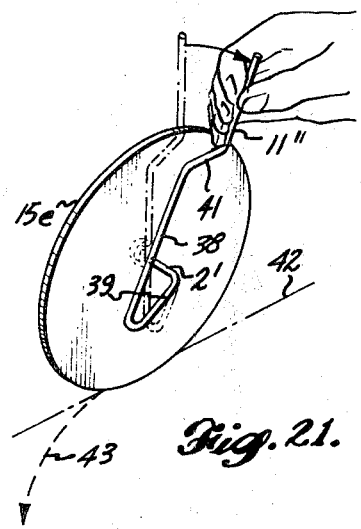
Figure 22:
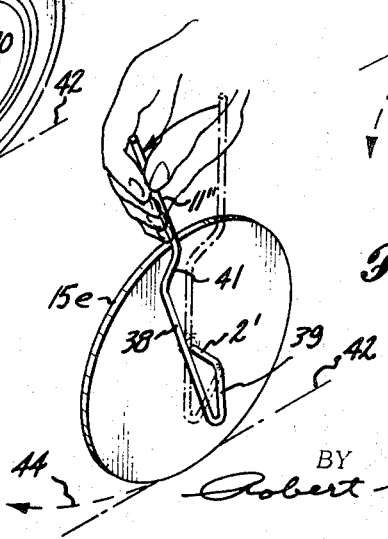

If the student holds the knuckle joint stems 11" lightly between his thumb and fingers in the vertical attitude shown in FIG. 20 and rolls the simulated wheel components along a surface, the simulated wheel components will travel along parallel straight lines 42. If, however, one of the stems, such as the right one, is tilted rearwardly as shown in FIG. 21 and the simulated wheel component 15e again is rolled along the surface, the simulated wheel component automatically will curve to the left from the straight course line 42 along the curved course line 43. Holding the stem 11" in this position represents a positive caster condition. Conversely, if the simulated knuckle joint stem 11" is tilted forwardly to the position of FIG. 22, representing a conditon of negative caster, and the simulated wheel component 15e again is rolled along a surface, the simulated wheel component will turn from the straight course line 42 to the right along the curved line 44.

By the manipulation described above, the student recognizes the desirability of providing positive caster in the right wheel of an automobile or negative caster in the left wheel of an automobile in order to induce the steering mechanism to compensate automatically for the crown of a road when the automobile is driven along the right portion of the road. Opposite caster will, of course, be provided if the automobile were to be driven customarily along the left side of the road, as in some countries. When the simulated component combination described in connection with FIGS. 19, 20, 21 and 22 is not being used, each device can be stored in the manual pocket 37 as shown in FIG. 18.

When the steering wheel is not moved, the position of the pivot connecting the drag link to the steering gear remains constant with respect to the chassis of the automobile. As the steering knuckle carrying the horn to which the drag link is connected changes elevation relative to the chassis, however, the horizontal projection of the drag link between the steering gear pivot and the horn on the steering knuckle changes to swing the horn. Consequently, such elevational change will effect turning of the front wheels relative to the chassis and the greater the change in elevation the greater will be such turning action even though the steering wheel is held stationary. The assembly shown in FIGS. 23, 24 and 25 has been devised to illustrate the wheel-turning effect caused by change in elevation between an automobile wheel and the chassis.

In FIGS. 23, 24 and 25 the components shown in the assembly are generally comparable to the components of the assemblies shown in FIGS. 5 and 8 for the most part. In this instance, however, the wheel mount component is separated into two components, one, 15a, representing a front automobile wheel and the other, 15f, representing a wheel mounting yoke. Again, these components have been printed with representations of a typical automobile wheel and wheel mounting yoke, respectively. One end of the simulated upper control arm component strip 17 is connected by pivot 18 to the upper portion of the wheel mounting yoke component 15f and one end of the simulated lower control arm component strip is connected by the pivot 22 to the lower portion of the same yoke component 15f. The other ends of the simulated upper control arm 17 and simulated lower control arm 21 are connected by fixed pivots 19' and 23', respectively, to the backing or manual sheet as in FIG. 8.

To enable the elevational movement of the wheel to be coupled with the tie rod connection to illustrate turning of the wheel effected by its elevational movement in the assembly of FIGS. 23, 24 and 25, the simulated wheel component 15a is connected to the simulated yoke component 15f by a pivot 11a corresponding to the king pin or yoke pivot. The pivot 11a enables the simulated wheel component and simulated yoke component to turn relatively and the angular relationship between these two components would be uncontrolled if it were not for the provision of a simulated tie rod 30' connected between the backing or manual page and a horn 46 projecting from the simulated wheel component 15a. Such horn offset from the axis of pivot 11a corresponds to the steering knuckle arm 29 of FIGS. 14, 15 and 16 to which the tie rod is connected. One end of such tie rod is connected by pivot 31 to the horn and its other end is connected by a fixed pivot 33' to the backing or manual sheet.

As the simulated upper control arm component 17 and the simulated lower control arm component 21 are swung so that their pivots 18 and 22 travel along the slots 23 and 25, respectively, the simulated wheel mount yoke component 15f changes elevation in the same manner as explained in connection with FIGS. 8, 9 and 10 and as illustrated in FIGS. 24 and 25. Because the wheel component 15a is not integral with the wheel mounting yoke component 15f in this instance, however, the angular relationship between these two components can be altered by the restraining action of the simulated tie rod connection. The steering effect of such tie rod on the wheel can be visualized by considering the wheel to be viewed in plan in FIGS. 23, 24 and 25 and ignoring the representation of the upper and lower control arms.

As the simulated wheel component 15a is moved from the position of FIG. 23 to that of FIG. 24 typifying upward movement of the wheel relative to the chassis, the horizontal projection of the tie rod will decrease so that the wheel mount carrying the steering knuckle arm horn will be turned counterclockwise as shown in FIG. 24. Conversely, as the simulated wheel component 15 descends relative to the chassis, represented by its movement from the position of FIG. 23 to that of FIG. 25, the horizontal projection of the tie rod decreases to pull the steering knuckle arm horn so that the wheel is turned in a clockwise direction.

It will be evident, therefore, that as an automobile front wheel and chassis change elevation relatively up and down, such wheel will be turned in and out correspondingly so that the toe-in and toe-out of the front wheels change. The turning action of the wheel is indicated by the departure of pointers 15' and 15" in FIGS. 24 and 25 from the straight course index line 28. This effect is minimized by shock absorbers which decrease the relative elevational movement between the wheel and the chassis.

I claim:
1. An instructional device for portraying displacement of an automobile wheel mount, comprising a flat backing, a sheet bearing a representation of a wheel in edge view, overlying said backing and located closer to said backing than the axial width of said wheel representation, and connecting means connecting said backing and said sheet in substantially parallel relationship and guiding said sheet for movement relative to said backing for portraying a predetermined type of motion of said wheel mount representation.

2. The device defined in claim 1, in which the sheet bears a representation of a wheel mounting yoke associated with the automobile wheel representation.

3. The device defined in claim 1, and reference indicia on the backing relative to which the sheet moves to indicate characteristics of the movement of the wheel representation on the sheet relative to the backing.

4. The device defined in claim 1, in which the connecting means includes a pivot directly connecting the sheet and the backing.

5. The device defined in claim 1, in which the connecting means includes pivot means directly connecting the sheet and the backing, and means representing a tie rod pivotally connected to the sheet and to the backing.

6. The device defined in claim 5, including a second sheet bearing a representation of a wheel mount and movable relative to the backing, and pivot means directly connecting said second sheet and the backing, the tie rod representing means pivotally interconnecting the two sheets.

7. The device defined in claim 5, in which the tie rod representing means includes a strip connected to the backing by a connection slidable generally lengthwise of said strip.

8. An instructional device for portraying displacement of an automobile wheel mount, comprising a flat backing, a sheet bearing a representation of a wheel mount, and connecting means connecting said backing and said sheet including a hinge connecting said sheet and said backing, representing the axis of a king pin or spindle yoke pivots, and guiding said sheet for movement between a position substantially coplanar with said backing and a position outstanding edgewise from said backing.

9. The device defined in claim 8, in which the connecting means further includes a supporting sheet carrying the hinge and attached to the backing, movable from a position substantially parallel to the backing into a position projecting edgewise from the backing.

10. An instructional device for portraying displacement of an automobile wheel mount, comprising a flat backing, a sheet bearing a representation of a wheel mount, and connecting means connecting said backing and said sheet in substantially parallel relationship including two spaced, generally parallel strips representing an upper control arm and a lower control arm, respectively, and pivot means connecting portions of said strips spaced lengthwise thereof to the backing and to the sheet, respectively, guiding said sheet for edgewise movement relative to said backing for portraying a predetermined type of motion of said wheel mount representation.

11. The device defined in claim 10, in which the pivot means includes a pivot connected to one strip and slidably received in a slot in the backing extending generally lengthwise of such strip.

12. The device defined in claim 10, in which the pivot means includes pivots connected respectively to the two strips and slidably received, respectively, in slots in the backing extending generally lengthwise of such strips.

13. The device defined in claim 10, in which the pivot means includes pivots connecting the strips, respectively, and the backing and pivots connecting the strips, respectively, and the sheet, the latter pivots being slidable along arcuate slots in the backing curved concentrically with the axes of said pivots connecting the strips, respectively, and the backing.

14. The device defined in claim 13, a second sheet separate from the sheet bearing the representation of the wheel mount, said second sheet bearing a representation of an automobile wheel, pivot means connecting the two sheets for relative turning, and means connected between the backing and said second sheet for effecting relative turning of the two sheets as the sheets are moved edgewise relative to the backing.

15. An instructional device for portraying displacement of an automobile wheel and its mount, comprising a generally flat backing, a sheet bearing a pictorial representation of an automobile wheel edge view, overlying said backing in a position substantially parallel thereto and located closer to said backing than the axial width of said wheel representation, and connecting means connecting said backing and said sheet and guiding said sheet for edgewise movement relative to said backing.

16. The instructional device defined in claim 15, in which the connecting means includes pivot means connecting the sheet and the backing, and additional means connecting the sheet and the backing and controlling turning of the sheet about said pivot means relative to the backing.

17. The instructional device defined in claim 15, in which the connecting means includes linkage means connecting the sheet and the backing for controlling movement of the sheet relative to the backing.

18. The instructional device defined in claim 17, in which the linkage means includes two generally parallel spaced links.

19. An instructional device for portraying displacement of an automobile wheel mount, comprising a sheet bearing a representation of an automobile wheel and its associated mounting viewed in elevation on a plane disposed transversely of the direction of automobile travel, a backing, means on said backing for supporting said sheet for pivotal movement about the center of said wheel elevation, said sheet including attachemnt means spaced vertically of said wheel elevation at one side thereof, upper and lower generally parallel simulated control arms having one end connected to said means, respectively, and projecting laterally from said wheel elevation, means for supporting the other ends of said control arms on said backing for relative lateral displacement, said relative lateral displacement causing pivotal movement of said wheel elevation representation about its pivotal support means, and means associated with said wheel elevation representation for indicating the amount of such pivotal movement.

20. An instructional device for portraying action of automobile steering wheels, comprising a pair of disks representing wheels, and wheel mounting means for each wheel including an axle on which the wheel is rotatably mounted, a wheel backing element connected to said axle and extending perpendicular thereto in opposite directions from said axle for engagement by the wheel to maintain it perpendicular to said axle and a stem projecting from said wheel backing element beyond the wheel circumference in a direction substantially radially of the wheel but offset laterally from the plane of said wheel.

References Cited

UNITED STATES PATENTS

| | | | |
|---|---|---|---|
| 2,449,499 | 9/1948 | Milburn | 35—13 |
| 2,494,072 | 1/1950 | Vetterli | 35—53 |
| 2,722,060 | 11/1955 | Flower et al. | 35—13 |
| 3,167,881 | 2/1965 | Mazzadra | 46—114 X |

FOREIGN PATENTS

| | | |
|---|---|---|
| 838,206 | 6/1960 | Great Britain. |

WILLIAM H. GRIEB, Primary Examiner